SEMICONDUCTOR FOR CONTROL PURPOSES

Filed Oct. 5, 1949 2 Sheets-Sheet 1

INVENTOR
HEINRICH WELKER
BY Theodore Haffner
ATTORNEY

July 13, 1954 | H. WELKER | 2,683,840

SEMICONDUCTOR FOR CONTROL PURPOSES

Filed Oct. 5, 1949 | 2 Sheets-Sheet 2

INVENTOR
HEINRICH WELKER
BY Theodore Hafner
ATTORNEY

Patented July 13, 1954

2,683,840

UNITED STATES PATENT OFFICE 2,683,840

SEMICONDUCTOR FOR CONTROL PURPOSES

Heinrich Welker, Vaucresson, France, assignor to Societe Anonyme dite: Compagnie des Freins & Signaux Westinghouse, Paris, France Application October 5, 1949, Serial No. 119,579

Claims priority, application France October 14, 1948

20 Claims. (Cl. 317—235)

Figure 1:
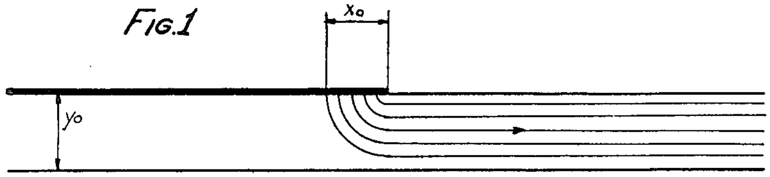

The utilization of semi-conductors such as germanium for producing current rectifying devices has been known for a long time. In the last few years various attempts have been made to produce with these semi-conductors relay actions similar to those performed by electronic tubes. Recent works (see in particular "Physical Review," July 15, 1948, p. 230, report by J. Bardeen and W. H. Brattain on a device called "Transistor") have led to the experimental presentation of an element composed essentially of a germanium crystal mounted on a grounded base and having applied on its upper surface two contact points separated by a gap varying from 50$\mu$ to 250$\mu$. One of these points forms the so-called "emitter" needle and the other point the "collector" needle and they correspond, apparently for the sake of analogy, to cathode and anode respectively, of a conventional vacuum tube triode. In order to utilize this element for electronic relay effects, it has been suggested to apply between the emitter needle and the grounded base on which the germanium block is laid, a signal source and a low negative polarisation voltage, arranged in series. A high negative polarisation is applied between the grounded base and the collector needle. The output signal appears at the terminals of a charging resistor connected in series with the later negative polarisation voltage.

In practice, such a system appears to offer several serious difficulties.

Firstly, in a system of this type, it is necessary to provide a crystal comprising two semi-conductive portions having different electronic characteristics (for example, one portion having an "electronic" or N-type (excess) conductivity characteristic and another portion having a "non-electronic" or P-type (deficiency) characteristic) both portions being separated by a barrier layer, which is an obvious complication.

Furthermore, two point-contact electrodes are required which are separated by a very small gap (of the order of 50$\mu$ to 250$\mu$ as specified above) which is difficult to realize in practice.

In addition, in this system, the anode current flowing from one point-contact electrode to the other, will pass only through a very thin layer (of the order of $10^{-5}$ cm.) of the crystal surface. If this current is relatively high it will bring about a substantial local heating due to the thinness of this layer. This would not occur if the current were applied to a larger mass.

Another drawback appears to reside in the fact that in the system under consideration, operation occurs in the "direct" sense (i. e. in the direction of the lowest crystal resistance). However, since the signal is of low power it is preferable to operate on the highest possible resistance, were it only for the purpose of avoiding loss of power through a low resistance.

Finally, where high control currents are used, there occurs an unacceptable increase of ground noise. This may drown out the signal entirely and therefore substantially reduce the possibilities of applying the system.

U. S. application Serial No. 109,752, filed by Herbert Francois Matare and Heinrich Welker on August 11, 1949, now Patent No. 2,673,948, and relating to a multi-electrode crystal device discloses a system adapted to produce electronic relay effects and eliminate some of the above-specified drawbacks, particularly that relating to the very small gap between the point-contact electrodes which, as explained herein above, is difficult to realize in practice. However, even with this system, some difficulties remain such as the necessity of using a crystal having portions of different electronic characteristics.

The present invention makes it possible to solve the above-mentioned difficulties and to obtain in a strikingly simple and practical manner a semi-conductive device providing electronic relay effects and adapted to perform control actions.

In the device according to the invention, in order to improve the conditions of using semi-conductors for electronic relay effects, use is made of a phenomenon described hereinafter with reference to Figs. 1 and 2 of the drawings.

If a thin semi-conductor (shown in cross-section in Figs. 1 and 2) is provided with a metal electrode, this electrode is susceptible to determine a barrier layer on the surface of the adjoining semi-conductor. If a current is applied along that portion of the semi-conductor which has no electrode, it will be observed that the current line pattern is changed as the direction of the current is reversed.

This change is such that in the "direct" sense (i. e. in the direction of smallest resistance of the semi-conductive crystal) the barrier layer will disappear; the lines of current terminate at right angles beneath the metal electrode along a distance $X_0$ which may be considered equal to thickness $Y_0$ of the semi-conductor (see Fig. 1).

Figure 2:
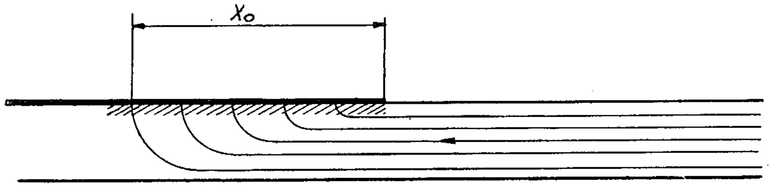

If the current is applied in the opposite sense (i. e. in the direction of highest resistance of the semi-conductive crystal) it will be noted that a barrier layer $a$ is formed and that length $X_o$ is widely spread (see Fig. 2).

In any case, length $X_o$ is determined by the formula:

$$(1) \qquad X_o/Y_o=\sqrt{1+2e\sigma/Y_o\sigma_r}$$

in which:

$e$ is the thickness of the barrier layer and depends on strength and sign of the current passing therethrough. It is zero for rather high currents flowing in the "direct" sense and may reach values of the order of $10^{-4}$ cm. for currents flowing in opposite direction:

$\sigma_r$ is the conductivity of the barrier layer;

$\sigma$ is the conductivity of the semi-conductor.

The effect described above results from the fact that lines of current tend to take a longer path parallel to the semi-conductor surface, and arrive at a larger surface for passing through the barrier layer.

With known values for asymmetric conductive devices or conventional rectifiers, it is possible to attain values of the order of:

$$X_o/Y_o=\sqrt{1+2\times 1000}\approx 40$$

If the chosen thickness of the semi-conductor is:

$$Y_o=50\mu$$

$X_o$ will be $200\mu$ or 0.2 cm.

The phenomenon just described differs essentially from that of the displacement of current lines which occurs on reversing the direction of current in systems where a semi-conductor block is formed of portions of different "electronic" characteristics (for instance, a thin semi-conductive layer of "electronic deficiency" characteristic on a semi-conductor of "electronic" characteristic) and where a point-contact electrode is placed on this block. In this case, in effect the displacement occurs only when the thickness of the layer of "electronic deficiency" characteristic is of the order of that of a barrier layer (average value—$10^{-5}$ cm., maximum value $10^{-4}$ cm.) while the phenomenon utilized for the present invention, occurs with a semi-conductor of uniform electronic characteristic, for a thickness of the semi-conductor of about $50\mu$.

It is an object of this invention to provide an improved semi-conductor device whereby control actions may be obtained as well as relay effects similar to those performed by means of electronic tubes. The device according to the invention makes it possible to replace the tubes in many applications. The invention presents the following features taken separately or in combination:

1. The invention resides in a thin-semi-conductive layer of the order of $50\mu$, and a maximum of $300\mu$ of uniform electronic character (e. g. entirely of "electronic" type characteristic or of "electronic deficiency" type characteristic) and provided with an emitter electrode and a collector electrode located at a given distance from each other and extending parallel to the surface of the semi-conductor; there also is a control electrode equally extending parallel to the surface of the semi-conductor;

2. The control electrode is arranged in the gap separating emitter and collector electrodes;

3. No barrier layer is provided where emitter and collector electrodes contact the surface of the semi-conductor, while a barrier layer is likely to occur where the control electrode engages the surface of the semi-conductor;

4. The center of the control electrode is offset in relation to the center of the gap between emitter and collector electrodes, in a direction toward the emitter electrode;

5. The collector electrode is connected in series with a signal source while the emitter electrode is connected in series with the anode voltage source;

6. The gap between collector and control electrodes is so restricted that the electrode system will still form a rectifier;

7. The gap between emitter and collector electrodes is so restricted that the electric resistance between these electrodes is lower than the electric resistance between control and collector electrodes.

8. The control electrode is so arranged with respect to the emitter electrode that the electric resistance measured in the "direct" sense (i. e. the direction of smallest resistance of the semi-conductor) between these two electrodes is lower than the electric resistance between emitter and collector electrodes;

9. In the case of a device having an electronic relay characteristic adapted for use at high frequencies, semi-conductors having great mobility of "electronic" type or "electronic-deficiency" type characteristics are used.

The above described multi-electrode semi-conductive devices constitute by themselves novel industrial products. In Figs. 3 through 7 of the accompanying drawings various embodiments of the invention are illustrated diagrammatically and by way of example only.

Figure 6:
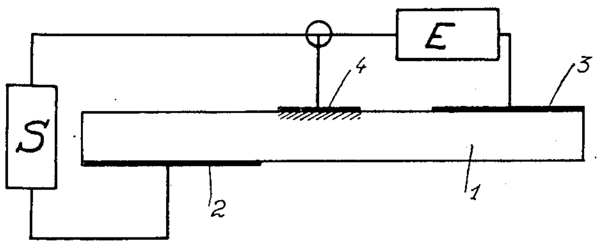
Figure 7:
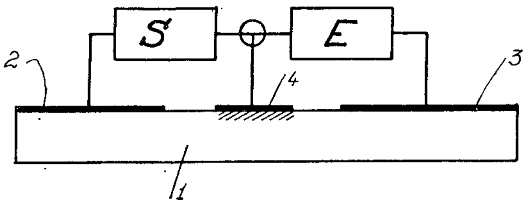
Figure 3:
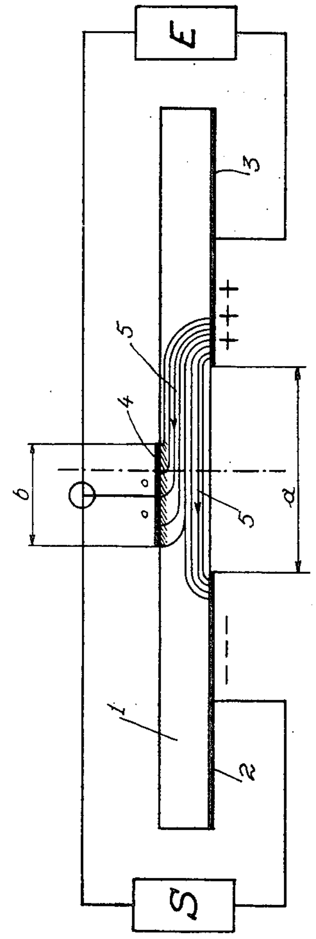
Figure 4:
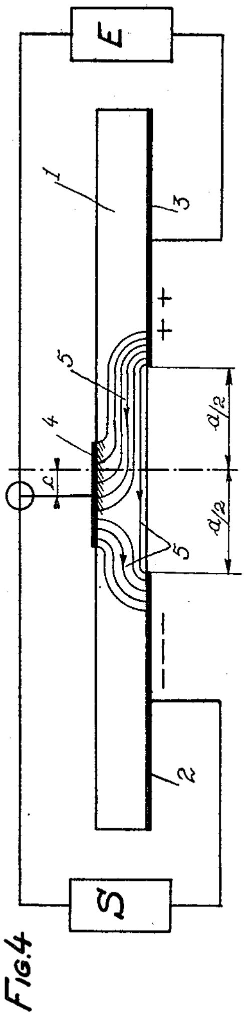
Figure 5:
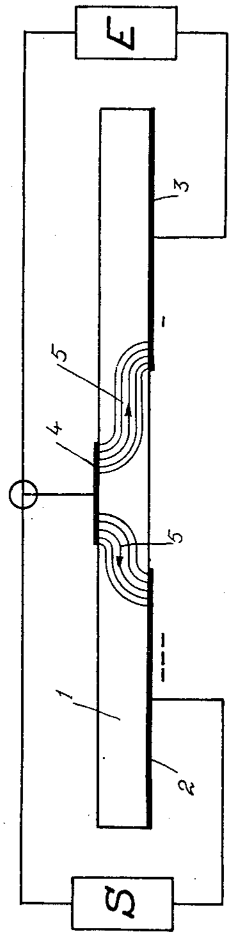

In the drawings:

Figs. 3 to 5 illustrate a first embodiment of the invention under several conditions of utilization; and Figs. 6 and 7 show two further embodiments of the invention with modified arrangements of the electrodes.

Considering first the embodiment illustrated in Figs. 3 to 5 it will be seen that the device consists of a thin-layer semi-conductor 1 having an average thickness of $50\mu$ and a maximum thickness of $300\mu$, of uniform electronic character, such as germanium. On one side thereof an emitter electrode 2 and a collector electrode 3 are applied, both extending parallel to the semi-conductor surface and separated by distance $a$. The other side of the semi-conductor has a control electrode 4 which also extends parallel to the surface of the semi-conductor. Control electrode 4 has width $b$ and is positioned in space $a$ between emitter electrode 2 and collector electrode 3.

The term "emitter" is used herein because the corresponding electrode emits charge-carrying particles (either of "electronic" (excess) or "electronic deficiency" types). The term "collector" has been selected because the corresponding electrode collects the charges in accordance with the action exerted by the control electrode.

As is also apparent from the figures, the center of the control electrode is offset by a distance $c$ with respect to the center of space $a$ in the direction of the emitter electrode.

Emitter electrode 2 and collector electrode 3 are disposed without any barrier layer on the lower side of the semi-conductor crystal and their extension is not specifically restricted.

When it is desired to use the above crystal device as a triode, a set of auxiliary devices is used as illustrated diagrammatically in Figs. 3 to 5 by blocks E and S in which the usual elements are incorporated, but not shown in detail, this being deemed unnecessary. Assembly E comprises the source of signal, the voltage for biasing the control electrode, ohmic resistors and, if desired, reactances (capacitances and inductances). Assembly E is connected in series with collector electrode 3. Assembly S comprises a source of anode voltage and suitable resistors, and is connected in series with emitter electrode 2.

The sign of the voltages applied, which should correspond to the polarity of the barrier layer, is that indicated in Figs. 5, 6 and 7 where the semi-conductor is of "electronic" type characteristic. This, of course, should be reversed in the case of a semi-conductor of "electronic deficiency" type characteristic.

In Fig. 3, the control current 5 determines a large barrier layer under electrode 4 (in accordance with the phenomenon described with respect to Figs. 1 and 2) and this layer will force anode current 6 to follow a path connecting directly electrodes 2 and 3 over the external resistance of block E toward block S. In this case, the resistance of the anode circuit is very high. In order that the "barrage" around electrode 4, the control electrode, be effective, width $b$ should be limited according to Formula 1: average value of $b=0.1$ mm.; maximum value=1 mm.

In Fig. 4, as the control voltage has been reduced, only a portion beneath control electrode 4 will be covered by a barrier layer and the current will flow along the path connecting electrodes 4 and 2. In order that this change occurs, through variation of the control voltage, the gap $$\frac{a}{2}+c$$

between electrodes 3 and 4 should be so restricted that this electrode system together with the semi-conductor will still form a rectifier: average value $$\frac{a}{2}+c=0.5\text{ mm.}$$

maximum value:

$$\frac{a}{2}+c=5\text{ mm.}$$

For operating the device as a "triode" the electric path of the anode current between the electrodes 2 and 3 should not exceed the length of the electric path between electrodes 3 and 4. In other words, distance $a$ should be small: average value $a=1$ mm.; maximum value: $a=5$ mm.

In order that the modification of the current line pattern illustrated in Fig. 3 with respect to that shown in Fig. 4, correspond to a substantial modification of the anode current, the electric path between electrodes 2 and 4, Fig. 4 should be shorter than the electric path between electrodes 2 and 3, Fig. 3. This condition may be obtained by displacing electrode 4 by a value equal to $c$ toward electrode 1.

Finally, it is essential, in order to ensure a suitable operation of the crystal triode, that the devices which form assemblies E and S be properly designed.

Fig. 5 shows the current line pattern when the control voltage is reversed, i. e. in the example under consideration when this voltage becomes positive and the current is flowing "directly."

It will be seen that according to value and sign of the control voltage, the barrier layer obtained at the contact-point of electrode 4 will vary from zero (Fig. 5) to a maximum value $b$ (Fig. 3), which correspondingly varies the path of the anode current and thus permits performance of a great variety of control effects.

For constructing the above described device any semi-conductor may be used, i. e. crystals commonly used for rectifying applications.

Thus, for example, a "crystal triode" adapted for low frequencies may be made with selenium, which has a very low electronic mobility, while germanium or silicon, due to their very high electronic mobility, are suitable for high frequencies.

Figs. 6 and 7 show other arrangements of electrodes, given by way of examples, wherein the same general characteristics are used as in the embodiments illustrated in Figs. 3 to 5.

I claim:

1. Semi-conductive device comprising a thin semi-conductive layer having throughout its mass the same type of electronic character, emitter and collector electrodes extending parallel to said layer and in direct contact therewith, said emitter and collector electrodes being situated respectively on each side of a plane perpendicular to said layer and at a predetermined distance from each other, and a control electrode arranged in the gap between emitter and collector electrodes and extending parallel to said layer, said control electrode being also in direct contact with said layer.

2. Device according to claim 1 comprising emitter and collector electrodes extending parallel to the layer at predetermined distance from each other, there also being a control electrode arranged in the gap between emitter and collector electrodes and extending parallel to said layer, said emitter and collector electrodes being arranged on the same side of said layer and said control electrode being arranged on the opposite side of said layer.

3. Device according to claim 1 comprising emitter and collector electrodes extending parallel to the layer at predetermined distance from each other, there also being a control electrode arranged in the gap between emitter and collector electrodes and extending parallel to said layer, said emitter and collector electrodes being arranged on opposite sides of said layer, and said control electrode being arranged on the same side as the emitter electrode at predetermined distance therefrom; the collector electrode being displaced with respect to emitter and control electrodes so as not to face said electrodes.

4. Device according to claim 1 comprising emitter and collector electrodes extending parallel to the layer at predetermined distance from each other, there also being a control electrode arranged in the gap between emitter and collector electrodes and extending parallel to said layer; said emitter and collector electrodes being arranged on opposite sides of said layer and said control electrode being arranged on the same side as the collector electrode at predetermined distance therefrom; the emitter electrode being displaced with respect to collector and control electrodes so as not to face said electrodes.

5. Device according to claim 1 comprising emitter and collector electrodes extending parallel to the layer at predetermined distance from each other; substantially no barrier layer being provided between said electrodes and said layer.

6. Device according to claim 1 comprising emitter and collector electrodes extending parallel to the layer at predetermined distance from each other, there also being a control electrode arranged in the gap between emitter and collector electrodes and extending parallel to said layer; substantially no barrier layer being provided between said emitter and collector electrodes and said layer; and a barrier layer susceptible to occur between said control electrode and said layer.

7. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including an emitter electrode, a collector electrode and a control electrode, said latter electrode being arranged in the gap existing parallelly to the surface of said semi-conductive layer between said emitter electrode and said collector electrode, whereas both emitter and collector electrodes are disposed on one side of said layer and said control electrode on the opposite side of said layer.

8. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including an emitter electrode, a collector electrode and a control electrode, said latter electrode being arranged in the gap existing parallelly to the surface of said semi-conductive layer between said emitter electrode and said collector electrode, whereas said emitter electrode is disposed on one side of said layer and said collector electrode together with said control electrode on the opposite side of said layer.

9. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including an emitter electrode, a collector electrode and a control electrode, said latter electrode being arranged in the gap existing parallelly to the surface of said semi-conductive layer between said emitter electrode and said collector electrode, whereas said emitter electrode is disposed on one side of said layer and said collector electrode together with said control electrode on the opposite side of said layer.

10. Device according to claim 1 comprising emitter and collector electrodes extending parallel to the layer at predetermined distance from each other, there also being a control electrode arranged in the gap between emitter and collector electrodes and extending parallel to said layer; the gap between collector and emitter electrodes being so determined that the electric resistance therebetween is lower than that between collector and control electrodes.

11. Device according to claim 1 comprising emitter and collector electrodes extending parallel to the layer at predetermined distance from each other, there also being a control electrode arranged in the gap between emitter and collector electrodes and extending parallel to said layer; said control electrode being so arranged with respect to the emitter electrode that the electric resistance therebetween measured in the direction of the smallest resistance of the semi-conductor is lower than that between emitter and collector electrodes.

12. Semi-conductive control device for high frequency operation comprising a semi-conductor germanium type layer of substantially uniform electronic character and average thickness at least of the order of 50$\mu$ and not more than of the order of 300$\mu$, and electrode means extending along said layer substantially parallel thereto.

13. Semi-conductive control device for high frequency operation comprising a semi-conductive silicon type layer of substantially uniform electronic character and average thickness at least of the order of 50$\mu$ and not more than of the order of 300$\mu$, and electrode means extending along said layer substantially parallel thereto.

14. Semi-conductive control device for low frequency operation comprising a semi-conductive selenium type layer of substantially uniform electronic character and average thickness at least of the order of 50$\mu$ and not more than of the order of 300$\mu$, and electrode means extending along said layer substantially parallel thereto.

15. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including a pair of emitter and collector electrodes and a control electrode in the gap between said pair of electrodes; the electric path of the anode current between emitter and collector electrodes being not longer than that between control and collector electrodes.

16. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including a pair of emitter and collector electrodes and a control electrode in the gap between said pair of electrodes; the gap between collector and control electrodes being so restricted that the electrode system forms a rectifier.

17. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including a pair of emitter and collector electrodes and a control electrode in the gap between said pair of electrodes; the gap between emitter and collector electrodes being so restricted that the electrical resistance therebetween is less than that between control and collector electrodes.

18. Semi-conductive relay device comprising a semi-conductive layer of substantially uniform electronic character and of average thickness of at least of the order of 50$\mu$ and not more than of the order of 300$\mu$; and electrode means extending along said layer substantially parallel thereto; said electrode means including a pair of emitter and collecter electrodes and a control electrode in the gap between said pair of electrodes, and so arranged with respect to said emitter electrodes that the electric resistance therebetween measured in the direction of lowest resistance of the semi-conductor is less than that between emitter and collector electrodes.

19. Device according to claim 1, in which the emitter and collector electrodes are arranged on the same side of said layer.

20. Device according to claim 1, in which the emitter and collector electrodes are arranged on opposite sides of said layer.

References Cited in the file of this patent

UNITED STATES PATENTS

| Number | Name | Date |
|---|---|---|
| 1,745,175 | Lilienfeld | Jan. 28, 1930 |
| 1,900,018 | Lilienfeld | Mar. 7, 1933 |
| 2,476,323 | Rack | July 19, 1949 |
| 2,502,479 | Pearson et al. | Apr. 4, 1950 |
| 2,517,960 | Barney et al. | Aug. 8, 1950 |
| 2,563,503 | Wallace | Aug. 7, 1951 |

FOREIGN PATENTS

| Number | Country | Date |
|---|---|---|
| 342,643 | Great Britain | Feb. 5, 1931 |
| 500,344 | Great Britain | Feb. 7, 1939 |